United States Patent [19]

Morimoto et al.

[11] Patent Number: 5,565,525

[45] Date of Patent: Oct. 15, 1996

[54] UNSATURATED CARBONYL AND ACTIVE HYDROGEN COMPONENTS WITH ONIUM SALT AND EPOXY COMPOUND

[75] Inventors: Hideo Morimoto, Hirakata; Kei Aoki, Ikoma; Takashi Irie, Suita; Hiroto Yoneda, Shijonawate, all of Japan

[73] Assignee: Nippon Paint Co., Ltd., Osaka, Japan

[21] Appl. No.: 328,649

[22] Filed: Oct. 26, 1994

[30] Foreign Application Priority Data

Oct. 27, 1993 [JP] Japan ................................. 5-292736
Oct. 27, 1993 [JP] Japan ................................. 5-292737

[51] Int. Cl.$^6$ .................. C08L 33/08; C08L 33/10; C08L 33/14; C08L 51/00; C08L 63/02; C08L 63/10; C08L 67/06; C08L 71/02

[52] U.S. Cl. .................. 525/259; 525/65; 525/66; 525/74; 525/101; 525/103; 525/108; 525/111; 525/112; 525/113; 525/118; 525/170; 525/255; 525/256; 525/261; 525/438; 525/440; 525/444; 525/445; 525/446; 525/452; 525/454; 525/455; 525/458; 525/476; 525/477; 525/478; 525/479; 525/529; 525/532; 525/187; 525/404

[58] Field of Search ................ 525/112, 65, 66, 525/74, 101, 103, 108, 111, 113, 118, 126, 170, 255, 256, 261, 259, 438, 440, 444, 445, 446, 452, 454, 455, 458, 476, 477, 478, 479, 529, 532, 187, 404

[56] References Cited

U.S. PATENT DOCUMENTS

| | | | |
|---|---|---|---|
| 4,217,396 | 8/1980 | Heckles | 525/386 |
| 4,408,018 | 10/1983 | Bartman et al. | 525/300 |
| 4,602,061 | 7/1986 | Akkerman | 525/445 |
| 5,017,649 | 5/1991 | Clemens | 525/59 |
| 5,021,511 | 6/1991 | Larson et al. | 525/295 |
| 5,084,536 | 1/1992 | Brindöpke et al. | 526/218.1 |

FOREIGN PATENT DOCUMENTS 0326723 8/1989 European Pat. Off. .

OTHER PUBLICATIONS

Derwent abstract No. 87–099121/14 for Japanese Patent No. 62–48720, Nippon Oils & Fats Co., Ltd., Mar. 1987.
Abstract 1–52117(A), Japan, Jun. 1989.
Abstract 1–167355, Japan, Jul. 1989.
Abstract 1–67356, Japan, Jul. 1989.
Abstract 1–229019(A), Japan, Sep. 1989.
Abstract of JP 1–121,341, May 1989.
Abstract of JP 1–204,919, Aug. 1989.
Abstract of EP 448,154, Sep. 1991.

*Primary Examiner*—Robert E. Sellers
*Attorney, Agent, or Firm*—Millen, White, Zelano & Branigan, P.C.

[57] ABSTRACT

A resin composition curable through a Michael reaction between (a) a component having a plurality of α, β-unsaturated carbonyl groups and (b) a component having a plurality of activated methylene, activated methyne or hydroxyl groups is disclosed. The curing reaction is catalyzed with a quaternary ammonium, quaternary phosphonium or tertiary sulfonium salt in the presence of an epoxy compound independently added to the composition or covalently attacted to either component (a) or component (b).

10 Claims, No Drawings

UNSATURATED CARBONYL AND ACTIVE HYDROGEN COMPONENTS WITH ONIUM SALT AND EPOXY COMPOUND

FIELD OF THE INVENTION

This invention relates to a curable resin composition for coating uses. More particularly, it relates to a resinous composition which cures through a Michael reaction.

BACKGROUND OF THE INVENTION

Michael reactions in which base-catalyzed addition of carboanions to activated unsaturated systems are utilized in the crosslinking of resinous compositions for use in coatings. These compositions are advantageous in that the Michael reaction gives a chemically stable crosslinking bond without forming any reaction by-product.

Typical examples of prior art include the following patent documents:

U.S. Pat. No. 4,408,018;
U.S. Pat. No. 5,017,649;
U.S. Pat. No. 5,084,536;
EP-A-0448154
JP-A-01/121341 (EP-A-0310011);
JP-A-01/204919 (EP-A-0326723);
JP-A-01/152117;
JP-A-01/167355;
JP-A-01/167356; and
JP-A-01/229019.

Michael reactions in general require a base catalyst for forming carboanions from active hydrogen sites such as activated methylene or methyne groups. Most of the prior art compositions utilizing the Michael reaction for crosslinking employ a strong base such as alkali metal hydroxides, alkali metal alkoxides, quaternary ammonium hydroxides or carbonates, tertiary amines, guanidines, amidines and tertiary phosphines.

Because such strong base catalysts may catalyze the Michael reaction even at ambient temperature, systems containing the strong base generally have to be formulated into a two component composition. The strong base catalyst may also hydrolyze or otherwise deteriorate resin components when retained in the films applied on substrates. For example, amines may cause yellowing of the cured films. Alkali metal based catalysts are hardly soluble in organic solvents conventionally used in coating compositions and, therefore, may result, when used, in cured films of unsatisfactory appearance.

JP-A-01/167356 discloses the use of quaternary ammonium salts with carboxylic acids. However, the quaternary ammonium carboxylates themselves have only a weak catalytic activity and do not promote the crosslinking reaction satisfactorily when used alone. Halides and other ammonium salts have been proven to have no or little catalytic activity when used alone.

JP-A-01/204919 discloses a catalyst system containing a tertiary amine and an epoxide. In the curing mechanism of this system, unlike the reaction in the absence of an activated methylene, the tertiary amine reacts first with the epoxide and then with a weakly acidic methylene component to form a quaternary ammonium salt resulting in the activation of the methylene group susceptible to the reaction with an alkene component. This means that carboanions are formed by the withdrawal of a hydrogen atom from the activated methylene as the tertiary amine is quaternized with the epoxide. It will be easily appreciated that the above activation mechanism does not apply to a pre-formed quaternary ammonium salt.

The present invention has its basis in the discovery that pre-formed quaternary ammonium or like onium salts having no or little catalytic activity may exhibit an adequate activity on a Michael type crosslinking reaction in the presence of an epoxide and various shortcomings of the prior art catalyst systems may be overcome by the present invention.

SUMMARY OF THE INVENTION

The present invention provides a curable resin composition for coating uses comprising:

(a) a component containing a plurality of a $\alpha, \beta$-ethylenically unsaturated carbonyl functions in the molecule;

(b) a component containing a plurality of at least one active hydrogen-containing groups selected from the group consisting of an activated methylene group, an activated methyne group and an hydroxyl group;

(c) an onium salt selected from the group consisting of a quaternary ammonium salt, a quaternary phosphonium salt and a tertiary sulfonium salt;

(d) an epoxy compound independently added to the composition or covalently attached to at least one of the above components (a) and (b).

The resin composition of the present invention may exhibit an adequate curability at ambient or elevated when temperatures and has a relatively long pot life even formulated into a two-component composition. Unlike amine catalysts, the onium salt will not cause yellowing or other deterioration in the resulting cured films. Furthermore, the solubility of the onium salt in the solvents commonly used in coating compositions may be increased by suitably selecting hydrocarbon residues attached to the onium atom so as to ensure uniform dissolution in the composition.

DESCRIPTION OF THE PREFERRED EMBODIMENTS

Component (a)

Component (a) is a compound or polymer having a plurality of ethylenic unsaturations between carbon atoms at the $\alpha$ and $\beta$ positions relative to a carbonyl group. Typical examples of such compound are acrylic or methacrylic (hereinafter collectively referred to as "(meth) acrylic") esters of polyhydric alcohols such as ethylene glycol di(meth)acrylate, diethylene glycol di(meth) acrylate, propylene glycol di(meth)acrylate, neopentyl glycol di(meth)acrylate, trimethylolpropane tri(meth) acrylate, glycerol tri(meth)acrylate, pentaerythritol tetra(meth)acrylate and the like. Acrylates or methacrylates of polyester polyols known as polyester acrylate resins fall within this class.

Unsaturated polyesters containing an unsaturated dicarboxylic acid such as maleic or fumaric acid may also be used as component (a). Unsaturated polyesters are used in large quantities for molding various FRP products and may be synthesized, as is well-known, by the polycondensation reaction between an $\alpha, \beta$-unsaturated dicarboxylic acid component such as maleic anhydride or fumaric acid optionally containing other polycarboxylic acids such as phthalic anhydride, isophthalic, terephthalic, adipic, sebacic or trimellitic acid and a polyol component such as ethylene glycol, diethylene glycol, propylene glycol, tetramethylene glycol, 1,6-hexanediol, neopentyl glycol, trimethylolpropane, glycerine or pentaerythritol.

Other examples of component (a) include epoxy acrylate resins produced by reacting (meth)acrylic acid with an epoxy resin such as bisphenol or novolac type epoxy resins, and urethane acrylate resins produced by reacting a hydroxyl group-containing acrylic resin first with an organic polyisocyanate such as isophoronediisocyanate, tolylenediisocyanate, diphenylmethanediisocyanate, hexamethylenediisocyanate or a urethane prepolymer thereof and then with 2-hydroxyethyl (meth)acrylate.

Acrylic resins containing a plurality of $\alpha$, $\beta$-unsaturated carbonyl functions may be produced via the ring-opening reaction of an epoxy ring with (meth)acrylic acid or the acylation of a hydroxyl group with (meth)acrylic acid. For example, epoxy group-containing acrylic resins may be produced by copolymerizing an epoxy group-containing acrylic monomer such as glycidyl (meth)acrylate with an acrylic monomer free of the epoxy group and/or a nonacrylic ethylenically unsaturated monomer. Examples of copolymerizable acrylic monomers include alkyl (meth) acrylates such as methyl, ethyl, propyl, n-butyl, isobutyl, t-butyl, 2-ethylhexyl or lauryl (meth)acrylate; hydroxyalkyl (meth)acrylates such as 2-hydroxyethyl (meth) acrylate; aryl or aralkyl (meth)acrylates such as phenyl or benzyl (meth)acrylate; PLACCEL FA1 or FM1 (adduct of 2-hydroxyethyl (meth)acrylate with polycaprolactone sold by Daicel Chemical Industries, Ltd.); and other acrylic monomers such as acrylamide, methylene-bis-acrylamide or acrylonitrile. Examples of copolymerizable non-acrylic monomers include styrene, $\alpha$-methylstyrene, itaconic acid, maleic acid, vinyl acetate and the like. The epoxide function of the acrylic copolymer may then be opened with (meth)acrylic acid to introduce the $\alpha$, $\beta$-unsaturated carbonyl function. Conversely, an epoxy group-containing acrylic monomer such as glycidyl (meth)acrylate may be reacted with an acrylic polymer containing a plurality of free carboxylic functions which may be produced by copolymerizing a carboxyl group-containing monomer such as acrylic, methacrylic or itaconic acid with a copolymerizable acrylic monomer and optionally with a nonacrylic monomer as discussed supra.

Acryl polyols containing a plurality of hydroxyl groups may be modified to have a plurality of $\alpha$, $\beta$-unsaturated carbonyl functions by the acylation reaction with acrylic or methacrylic acid or a reactive derivative thereof such as chloride, or the transesterification reaction with a lower alkyl (meth)acrylate such as methyl (meth)acrylate. Acryl polyols may be produced by copolymerizing a hydroxyl group-containing acrylic monomer such as 2-hydroxyethyl (meth)acrylate, 2-hydroxypropyl (meth)acrylate, 4-hydroxybutyl (meth)acrylate or PLACCEL FM-1 with a copolymerizable acrylic and/or non-acrylic monomer as discussed supra.

Further examples of component (a) include polyether acrylate resins such as polyethylene glycol di(meth) acrylate, and silicone oligoners such as 3-methacryloyloxypropyl-terminated polydiorganosiloxanes.

When component (a) is a resin, its molecular weight ranges between 400 and 100,000, preferably between 600 and 10,000, and the alkenyl equivalent weight ranges between 100 and 10,000, preferably between 100 and 1,000. The term "equivalent weight" as used herein refers to the molecular weight divided by the number of a function concerned.

Component (b)

A first type of compounds or resins useable as component (b) has a plurality of activated methylene or methyne groups in the molecule. Typical examples of activated methylene compounds are acetoacetic acid, cyanoacetic acid, malonic acid and derivatives of these acids. Component (b) having a plurality of activated methylene groups may be prepared from these activated methylene carboxylic acids or derivatives thereof. For example, polyols may be reacted with a reactive derivative of acetoacetic, cyanoacetic or malonic acid to obtain component (b). Polyols may be a polyhydric alcohol used in the production of unsaturated polyesters as the polyol component thereof, or a polymeric polyol such as acryl polyols, polyester polyols, polyether polyols, epoxy polyols, polyurethane polyols or silicone polyols. Reactive derivatives of acetoacetic, cyanoacetic or malonic acid may be their lower alkyl esters or halides. Polyester resins having a plurality of activated methylene groups may be produced by polycondensating a polycarboxylic acid component containing dialkyl malonates and a polyol component as discussed supra.

Component (b) having a plurality of acetoacetamide groups may be produced by reacting diketene with a polyamine such as ethylenediamine, 1,3-diaminopropane, 1,4-diaminobutane, 1,6-hexanediamine, 1,12-diaminododecane, 1,2-diaminocyclohexane, phenylenediamine, piperazine, 2,6-diaminotoluene, diethyltoluenediamine, N,N'-bis(2-aminopropyl)-ethylenediamine, or N,N'-bis(3-aminopropyl)-1,3-propanediamine.

Acrylic resins having a plurality of activated methylene groups may be produced by copolymerizing an acrylic monomer having an activated methylene group such as 2-acetoacetoxyethyl (meth)acrylate, 2-cyanoacetoxyethyl (meth)acrylate, N-(2-cyanoacetoxyethyl)acrylamide, N-(2-propionylacetoxybutyl)acrylamide, N-(4-acetoacetoxymethyl) benzylacrylamide, N-(2-acetoacetylaminoethyl)acrylamide or N-(2-acetoacetylaminoethyl)methacrylamide with an acrylic and/or nonacrylic monomer as discussed supra with regard to component(a).

Component (b) having a plurality of activated methyne groups may be produced, as disclosed in EP-A-0310011, by the transesterification between a trialkyl methanetricarboxylate and a nonpolymeric or polymeric polyol, or by the addition reaction between an activated methylene compound and an isocyanate compound. As will be apparent, either one of the activated methylene and isocyanate reactants should be polyfunctional. For example, a polyisocyanate reactant produced by reacting a diisocyanate with a polyol at an NCO/OH ratio of greater than 1 may be reacted with a monofunctional activated methylene reactant such as dialkyl malonate. Alternatively, those compounds or resins having a plurality of activated methylene groups as discussed supra may be reacted with a monofunctional isocyanate.

Component (b) having a plurality of hydroxyl groups may be polyhydric alcohols, acryl polyols, polyester polyols, polyether polyols, epoxy polyols, polyurethane polyols or silicone polyols. Polyhydric alcohols and acryl polyols as discussed supra may also be used as component (b). Examples of polyester polyols include hydroxy-terminated polyesters and polycaprolactone polyols. Polyether polyols may be produced by addition polymerizing an alkylene oxide such as ethylene oxide or propylene oxide using an initiator and a base catalyst. Epoxy polyols may be produced by reacting an epoxy resin such as bisphenol A epoxy resin with an aminoalcohol such as diethanolamine to open the epoxy ring with the amino group. Polyurethane polyols may be produced by reacting a polyol with a polyisocyanate an OH/NCO ratio of greater than 1. Silicone polyols are organopolysiloxanes having a plurality of, for example, 3-(2-hydroxyethyl) propylmethylsiloxy units such as KR-2001 sold by Shin-Etsu Chemical Co., Ltd.

Component (b) may have more than one active hydrogen species to be added to component (a). For example, a copolymer of a monomer mixture containing an activated methylene-containing acrylic monomer and a hydroxy-containing acrylic monomer, and a polyester polyol containing malonic acid as a polycarboxylic acid component may be used as component (b).

When component (b) is a resin, its molecular weight ranges between 1,000 and 100,000, preferably between 1,000 and 10,000, and the active hydrogen equivalent weight ranges between 40 and 10,000, preferably between 80 and 5,000.

Component (c)

A variety of ammonium salts may be used. However, tetraalkyl and trialkylaralkyl type ammonium salts are preferred for economical reasons. Nitrogen-containing heterocyclic ammoniums salts such as those derived from pyridine, piperidine, piperazine or morpholine may also be used. Specific examples of ammonium cations include tetrabutylammonium, tetramethylammonium, tetraethylammonium trimethylbenzylammonium, tetrapropylammonium, tetrahexylammonium, tetraoctylammonium, tetradecylammonium, tetrahexadecylammonium, triethylhexylammonium, 2-hydroxyethyltrimethylammonium (choline), methyltrioctylammonium, cetyltrimethylammonium, 2-chloroethyltrimethylammonium and methylpyridinium.

Counter anions should be capable of forming a non-basic stable salt with the ammonium cations and include halides, carboxylates, sulfonates, nitrate, sulfate, sulfite, phosphate and the like. Specific examples thereof include acetate, laurate, glycolate, benzoate, salicylate, maleate, phthalate, fluoride, chloride, bromide, iodide, methanesulfonate, p-toluenesulfonate, dodecylbenzene sulfonate, triflate, nitrate, sulfate, methosulfate, phosphate and acid t-dibutylphosphate. Quaternary phosphonium salts such as tetrabutylphosphonium bromide and tertiary sulfonium salts such as trimethylsulfonium iodide may also be used.

Onium salts, among others, having counter anions derived from phenol carboxylic acids such as salicylic acid, polybasic carboxylic acids such as oxalic, maleic, fumaric or phthalic acid, nitric acid, phosphoric acid, sulfurous acid, phosphate ester or sulfonic acid exhibit a catalytic activity only in the presence of an epoxy component under the conventional baking condition. Accordingly, they are useful when a thermosetting, storage stable, one-component composition is desired.

Component (d)

When used as a discrete component, preferred examples of component (d) include glycidyl ethers such as phenyl glycidyl ether, bisphenol epoxy resins, reaction products of epichlorohydrine with a polyhydric alcohol such as ethylene glycol or trimethylolpropane; glycidyl esters such as glycidyl benzoate, glycidyl (meth)acrylate or its polymers; alicyclic epoxides such as 4-(3,4-epoxycyclohexyl) methoxycarbonyl-1,2-cyclohexane, 3,4-epoxycyclohexylmethyl (meth)acrylate or its polymers; and α-olefin epoxides such as epoxyhexadecane.

When component (a) is a resin, its molecular weight ranges between 400 and 100,000, preferably between 400 and 10,000, and the epoxy equivalent weight ranges between 200 and 100,000, preferably between 200 and 5,000.

Component (d) may be attached to component (a) or (b) through a covalent bond. This may conveniently be performed by reacting acrylic or methacrylic acid in an amount less than a stoichiometric ratio with an epoxy resin or an epoxy group-containing acrylic resin to produce component (a) having remaining epoxy groups. Component (b) having epoxy groups covalently attached thereto may conveniently be produced by copolymerizing an epoxy group-containing monomer such as glycidyl (meth)acrylate, β-methylglycidyl (meth) acrylate or 3,4-epoxycyclohexylmethyl (meth)acrylate.

Curable resin compositions

The proportions of component (a) and component (b) in the curable resin composition of the present invention generally lie between 2:1 and 1:2, preferably between 1.5:1 and 1:1.5 relative to the double bond and the active hydrogen atom to be added thereto. The proportion of component (c) may range generally between 0.1 and 10.0 equivalent %, preferably between 0.2 and 5.0 equivalent % based on the sum of component (a) and component (b). The proportion of component (d) may range generally between 0.5 and 100 equivalent %, preferably between 5.0 and 40 equivalent % based on the sum of component (a) and component (b).

When used as a coating composition, it may contain a variety of conventional additives such as solvent, extender pigments, coloring pigments, sag-preventing agents, UV absorbers and the like. After applying onto a substrate as a film, the composition may be cured, depending upon the type of onium salt catalyst, by leaving at ambient temperature or baking the film at a temperature between 100° C. and 200° C., preferably between 120° C. and 150° C.

The curable resin composition may find use as a clear top coat composition to be applied on a color base coat. The base coat composition may be solvent type or water-borne compositions containing metallic or solid color pigments. The base and top coats may conveniently be applied using so-called two coats-one bake method by applying the top coat on the base coat wet-on-wet and then baking both coats simultaneously. When the base coat is a water-borne system, it is preferable to subject the base coat to a preheating step at a temperature of 60°–100° C. for 2–10 minutes before applying the top coat thereon. Base coat compositions useful in the above applications are disclosed, for example, in U.S. Pat. Nos. 5,151,125 and 5,183,504. Particularly, a water-borne composition disclosed in Example 1 of U.S. Pat. No. 5,183,504 may be used to advantage in combination with the composition of the present invention used as a top coat in order to give a multi-layer coating having satisfactory finish, appearance and other properties. It is very important for the top coat to be used for the above application particularly for finishing automobile bodies to have a satisfactory scratch resistance and acid rain resistance. The composition of the present invention is advantageous in these properties over conventional systems containing a melamine resin as a crosslinker.

The following examples are intended to illustrate the present invention without limiting thereto. All parts and percents therein are by weight unless otherwise specified.

Production Example 1

To a 4-necked flask charged with 360 parts of xylene was added dropwise a monomer mixture containing a polymerization initiator shown in Table 1 at 110° C. over 3 hours. After the addition, the mixture was allowed to react at 110° C. for 30 minutes. Then 2 parts of KAYAESTER O (t-butylperoxyoctate sold by Nippon Kayaku Co., Ltd.) in 40 parts of xylene were added dropwise at 110° C. over 30 minutes and the mixture allowed to react at the same temperature for additional 90 minutes. An acrylic resin solution having 49.4% nonvolatile, a number average molecular weight Mn measured by the GPC method of 4,300, an activated methylene equivalent weight of 200, and an epoxy equivalent weight of 1002 was obtained.

Production Examples 2–10

Production Example 1 was followed using a mixture shown in Table 1, respectively. Nonvolatile contents, Mn's and other data are also shown in Table 1.

TABLE 1

| Material, parts | Production Example | | | | |
|---|---|---|---|---|---|
| | 1 | 2 | 3 | 4 | 5 |
| 2-Acetoacetoxyethyl methacrylate | 214 | 214 | 214 | 214 | — |
| 2-Hydroxyethyl methacrylate | — | — | — | — | 130 |
| n-Butyl methacrylate | 129 | 147 | 155 | 186 | — |
| Methyl methacrylate | — | — | — | — | 69 |
| Styrene | — | — | — | — | 99 |
| n-Butyl acrylate | — | — | — | — | 74 |
| Glycidyl methacrylate | 57 | — | — | — | 28 |
| M-100[1] | — | 39 | — | — | — |
| M-GMA[2] | — | — | 31 | — | — |
| KAYAESTER O | 18 | 18 | 18 | 18 | 18 |
| Nonvolatile, % | 49.4 | 50.0 | 48.7 | 49.4 | 50.9 |
| Mn | 4,300 | 4,300 | 4,000 | 4,400 | 5,900 |
| Active H equivalent wt. | 200 | 200 | 200 | 200 | 401 |
| Epoxy equivalent wt. | 1,002 | 2,004 | 2,004 | — | 2,004 |

| Material, parts | Production Example | | | | |
|---|---|---|---|---|---|
| | 6 | 7 | 8 | 9 | 10 |
| 2-Acetoacetoxyethyl methacrylate | — | — | 107 | 107 | — |
| 2-Hydroxyethyl methacrylate | 130 | 130 | 65 | 65 | — |
| n-Butyl methacrylate | — | — | — | — | 240 |
| Methyl methacrylate | 69 | 108 | 57 | 65 | 59 |
| Styrene | 99 | 76 | 82 | 93 | — |
| n-Butyl acrylate | 63 | 86 | 61 | 70 | — |
| Glycidyl methacrylate | — | — | 28 | — | 101 |
| M-100 | 39 | — | — | — | — |
| KAYAESTER O | 18 | 18 | 18 | 18 | 18 |
| Nonvolatile, % | 50.5 | 49.8 | 50.6 | 50.9 | 50.8 |
| Mn | 5,500 | 5,300 | 4,600 | 4,500 | 4,900 |
| Active H equivalent wt. | 401 | 401 | 267 | 267 | — |
| Epoxy equivalent wt. | 2,004 | — | 2,004 | — | 561 |

[1] 3,4-epoxycyclohexylmethyl methacrylate, Daicel Chemical Industries, Ltd.
[2] β-methylglycidyl methacrylate, Daicel Chemical Industries, Ltd.

Production Example 11

To 394 parts of the acrylic resin solution of Production Example 10 (200 parts as solids) were added 0.1 parts of hydroquinone, 1.0 part of tetrabutylammonium bromide and 24 parts of methacrylic acid. The mixture was allowed to react at 120° C. until an acid number of less than 1 was reached. A resin solution having a nonvolatile content of 52.8%, an alkene equivalent weight of 790, and an epoxy equivalent weight of 3,300 was obtained.

Production Example 12

Production Example 11 was followed except that the amount of methacrylic acid was increased to 30 parts. A resin having a nonvolatile content of 53.0% and an alkene equivalent weight of 630 was obtained.

Production Example 13

A reactor was charged with 236 parts of 1,6-hexanediol, 78 parts of dimethyl phthalate, 230 parts of dimethyl maleate and 1 part of dibutyltin oxide. The mixture was heated gradually to 200° C. while distilling off methanol formed by a transesterification reaction. Then the reaction was continued at 200° C. until no distillation of methanol was found. After cooling 250 parts of xylene were added. A resin solution having a nonvolatile content of 61.4%, Mn of 1,700, and an alkene equivalent weight of 264 was obtained.

Production Example 14

A reactor was charged with 236 parts 1,6-hexanediol 264 parts of dimethyl malonate and 1 part of dibutyltin oxide. The mixture was heated gradually to 200° C. while distilling off methanol formed by a transesterification reaction. Then the reaction was continued at 200° C. until no distillation of methanol was found. After cooling 250 parts of xylene were added. A resin solution having a nonvolatile content of 58.8%, Mn of 1,800 and an active hydrogen equivalent weight of 91 was obtained.

Production Example 15

A reactor was charged with 118 parts of 1,6-hexanediol, 148 parts of isophoronediisocyanate and 266 parts of methyl isobutyl ketone (MIBK). The mixture was allowed to react at 80° C. until an NCO number of less than 1 was reached. A resin solution having a nonvolatile content of 49.7%, Mn of 800 and an hydroxyl equivalent weight of 400 was obtained.

EXAMPLE 1

405 parts of the resin solution of Production Example 1 (200 parts as solids), 100 parts of pentaerythritol triacrylate (PETA) and 2 parts of tetrabutylammonium nitrate (TBANO) were thoroughly mixed to make a solution. The solution was applied on a tinplate using a #40 bar coater and heated in an oven at 140° C. for 20 minutes. The gel fraction of the resulting cured film was determined based on the difference of weight before and after soaking the film in a 1:1 mixture of acetone and methanol at room temperature for 48 hours. The result is shown in Table 2. The composition was stable upon storage at 40° C. for 10 days.

EXAMPLE 2

Example 1 was followed except that 1 part of tetrabutylammonium methanesulfonate (TBAMS) were replaced for TBANO. The gel fraction of the cured film is shown in Table 2. The composition was stable upon storage at 40° C. for 10 days.

EXAMPLE 3

Example 1 was followed except that 2 parts of tetrabutylammonium di-t-butylphosphate (TBAP) were replaced for TBANO. The gel fraction of the cured film is shown in Table 2. The composition was stable upon storage at 40° C. for 10 days.

Comparative Examples 1–3

Examples 1–3 were followed, respectively, except that 405 parts of the resin solution of Production Example 4 (200 parts as solids) were replaced for the resin solution of Production Example 1. The results are shown in Table 2.

TABLE 2

| | Example | | | Comparative Example | | |
|---|---|---|---|---|---|---|
| | 1 | 2 | 3 | 1 | 2 | 3 |
| Component (a), parts | PETA 100 | PETA 100 | PETA 100 | PETA 100 | PETA 100 | PETA 100 |
| Component (b), parts | Pro. Ex. 1 405 | Pro. Ex. 1 405 | Pro. Ex. 1 405 | Pro. Ex. 4 405 | Pro. Ex. 4 405 | Pro. Ex. 4 405 |
| Component (c), parts | TBANO 2 | TBAMS 1 | TBAP 2 | TBANO 2 | TBAMS 1 | TBAP 2 |
| Component (d), parts | contained in (b) | contained in (b) | contained in (b) | Not present | Not present | Not present |
| Curing condition | 140° C. × 20 min | 140° C. × 20 min | 140° C. × 20 min | 140° C. × 20 min | 140° C. × 20 min | 140° C. × 20 min |
| Gel fraction, % | 93.1 | 94.8 | 95.1 | 0 | 0 | 0 |

EXAMPLE 4

A blend of 405 parts of the resin solution of Production Example 1 (200 parts as solids), 50 parts of trimethylolpropane triacrylate (TMPTA) and 3 parts of tetrabutylphosphonium bromide (TBPBr) was applied on a tinplate as in Example 1, allowed to cure at 20° C. for 6 hours, and tested for the gel fraction. The result is shown in Table 3.

EXAMPLE 5

Example 4 was followed except that 2 parts of trimethylbenzylammonium acetate (TMBAAc) were replaced for TBPBr. The gel fraction is shown in Table 3.

Comparative Examples 4–5

Examples 4–5 were followed, respectively, except that 405 parts of the resin solution of Production Example 4 (200 parts as solids) were replaced for the resin solution of Production Example 1. The results are shown in Table 3.

EXAMPLE 6

A blend of 393 parts of the resin solution of Production Example 5 (200 parts as solids), 150 parts of KAYARAD DPCA-120 (dipentaerythritol (1 mol)/caprolactone (12 moles) adduct hexaacrylate sold by Nippon Kayaku Co., Ltd.) and 2 parts of tetrabutylammonium chloride (TBACl) was applied on a tinplate as in Example 1, baked at 160° C. for 20 minutes, and tested for the gel fraction. The result is shown in Table 4.

EXAMPLE 7

A blend of 395 parts of the resin solution of Production Example 6 (200 parts as solids), 50 parts of PETA and 2 parts of tetrabutylammonium acetate(TBAAc) was applied on a tinplate as in Example 1, baked at 140° C. for 20 minutes, and tested for the gel fraction. The result is shown in Table 4.

Comparative Example 6

Example 6 was followed except that 396 parts of the resin solution of Production Example 7 were replaced for the resin solution of Production Example 5. The result is shown in Table 4.

TABLE 3

| | Example | | Comparative Example | |
|---|---|---|---|---|
| | 4 | 5 | 4 | 5 |
| Component (a), parts | TMPTA 50 | TMPTA 50 | TMPTA 50 | TMPTA 50 |
| Component (b), parts | Pro. Ex. 1 405 | Pro. Ex. 1 405 | Pro. Ex. 4 405 | Pro. Ex. 4 405 |
| Component (c), parts | TBPBr 3 | TMBAAc 2 | TBPBr 3 | TMBAAc 2 |
| Component (d), parts | contained in (b) | contained in (b) | Not present | Not present |
| Curing condition | 20° C. × 6 hr. | 20° C. × 6 hr. | 20° C. × 6 hr. | 20° C. × 6 hr. |
| Gel fraction, % | 72.4 | 90.8 | 0 | 70.3 |

Comparative Example 7

Example 7 was followed except that 396 parts of the resin solution of Production Example 7 were replaced for the resin solution of Production Example 6. The result is shown in Table 4.

TABLE 4

| | Example | | Comparative Example | |
|---|---|---|---|---|
| | 6 | 7 | 6 | 7 |
| Component (a), parts | DPCA-120 150 | PETA 50 | DPCA-120 150 | PETA 50 |

TABLE 4-continued

|  | Example | | Comparative Example | |
|---|---|---|---|---|
|  | 6 | 7 | 6 | 7 |
| Component (b), parts | Pro. Ex. 5 393 | Pro. Ex. 6 395 | Pro. Ex. 7 396 | Pro. Ex. 7 396 |
| Component (c), parts | TBACl 2 | TBAAc 2 | TBACl 2 | TBAAc 2 |
| Component (d), parts | Contained in (b) | Contained in (b) | Not present | Not present |
| Curing condition | 160° C. × 20 min | 140° C. × 20 min | 160° C. × 20 min | 140° C. × 20 min |
| Gel fraction, % | 90.8 | 94.2 | 0 | 0 |

EXAMPLE 8

A blend of 396 parts of the resin solution of Production Example 7 (200 parts as solids), 95 parts of UA-306H (adduct of hexamethylenediisocyanate and pentaerythritol triacrylate at 1:2 in moles sold by Kyoeisha Yushi Kagaku Kogyo K.K.), 15 parts of EPIKOTE 825 (bisphenol A diglycidyl ether sold by Yuka Shell Epoxy Co., Ltd.) and 2 parts of tetrabutylammonium salicylate (TBASA) was applied on a tinplate, baked at 140° C. for 20 minutes, and tested for the gel fraction. The result is shown in Table 5.

EXAMPLE 9

A blend of 393 parts of the resin solution of Production Example 8 (200 parts as solids), 200 parts of KAYARAD DPCA-120 and 3 parts of tetrabutylammonium bromide (TBABr) was applied on a tinplate, baked at 140° C. for 20 minutes, and tested for the gel fraction. The result is shown in Table 5.

EXAMPLE 10

A blend of 394 parts of the resin solution of Production Example 9 (200 parts as solids), 200 parts of KAYARAD DPCA-120 and 30 parts of SHODAIN 508 (diglycidyl phthalate sold by Showa Denko K.K.) and 3 parts of TBABr was applied on a tinplate, baked at 140° C. for 20 minutes, and tested for the gel fraction. The result is shown in Table 5.

Comparative Example 8

Example 10 was followed except that SHODAIN 508 was not added to the composition. The result is shown in Table 5.

EXAMPLE 11

A blend of 405 parts of the resin solution of Production Example 1 (200 parts as solids), 75 parts of PETA and 4 parts of trimethylsulfonium iodide (TMSI) was applied on a tinplate, baked at 160° C. for 20 minutes, and tested for the gel fraction. The result is shown in Table 5.

EXAMPLE 12

Example 11 was followed except that 4 parts of cetylpyridinium bromide (CPBr) were replaced for TMSI. The result is shown in Table 5.

TABLE 5

|  | Ex. 8 | Ex. 9 | Ex. 10 | Comp. Ex. 8 | Ex. 11 | Ex. 12 |
|---|---|---|---|---|---|---|
| Component (a), parts | UA306H 95 | DPCA-120 200 | DPCA-120 200 | DPCA-120 200 | PETA 75 | PETA 75 |
| Component (b), parts | Pro. Ex. 7 396 | Pro. Ex. 8 393 | Pro. Ex. 9 394 | Pro. Ex. 9 394 | Pro. Ex. 1 405 | Pro. Ex. 1 405 |
| Component (c), parts | TBASA 2 | TBABr 3 | TBABr 3 | TBABr 3 | TMSI 4 | CPBr 4 |
| Component (d), parts | EPIKOTE825 15 | Contained in (b) | SHODAIN508 30 | Not present | Contained in (b) | Contained in (b) |
| Curing condition | 140° C. × 20 min | 140° C. × 20 min | 140° C. × 20 min | 140° C. × 20 min | 160° C. × 20 min | 160° C. × 20 min |
| Gel fraction, % | 93.9 | 96.4 | 93.6 | 0 | 90.4 | 86.1 |

EXAMPLE 13

A blend of 400 parts of the resin solution of Production Example 2 (200 parts as solids), 200 parts of NK ESTER A-400 (polyethylene glycol (n=9) diacrylate sold by Shin-Nakamura Kagaku Kogyo K.K.) and 2 parts of trimethylbenzylammonium chloride (TMBACl) was applied on a tinplate, baked at 140° C. for 20 minutes, and tested for the gel fraction. The result is shown in Table 6.

EXAMPLE 14

A blend of 411 parts of the resin solution of Production Example 3 (200 parts as solids), 200 parts of EPOXY ESTER 3002A (reaction product of propylene oxide-bisphenol A adduct diglycidyl ester with acrylic acid sold by Kyoeisha Yushi Kagaku Kogyo) and 3 parts of tetrabutylammonium iodide (TBAI) was applied on a tinplate, baked at 140° C. for 20 minutes, and tested for the gel fraction. The result is shown in Table 6.

EXAMPLE 15

A blend of 379 parts of the resin solution of Production Example 11 (200 parts as solids), 25 parts of ditrimethylolpropane tetraacetoacetate (DTMPTA) and 2 parts of TBABr was applied on a tinplate, baked at 140° C. for 20 minutes, and tested for the gel fraction. The result is shown in Table 6.

EXAMPLE 16

A blend of 377 parts of the resin solution of Production Example 12 (200 parts as solids), 30 parts of DTMPTA, 15 parts of EPIKOTE 825 and 2 parts of TBABr was applied on a tinplate, baked at 140° C. for 20 minutes, and tested for the gel fraction. The result is shown in Table 6.

Comparative Example 9

Example 16 was followed except that EPIKOTE 825 was not added. The result is shown in Table 6.

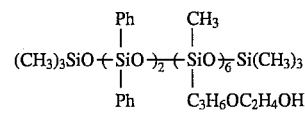

EXAMPLE 20

A blend of 379 parts of the resin solution of Production Example 11 (200 parts as solids), 101 parts of the resin solution of Production Example 15 (50 parts as solids), 4 parts of glycerine and 2 parts of TBASA was applied on a tinplate, baked at 140° C. for 20 minutes, and tested for the gel fraction. The result is shown in Table 7.

TABLE 6

|  | Ex. 13 | Ex. 14 | Ex. 15 | Ex. 16 | Comp. Ex. 9 |
|---|---|---|---|---|---|
| Component (a), parts | A-400 200 | 3002A 200 | Pro. Ex. 11 379 | Pro. Ex. 12 377 | Pro. Ex. 12 377 |
| Component (b), parts | Pro. Ex. 2 400 | Pro. Ex. 3 411 | DTMPTA 25 | DTMPTA 30 | DTMPTA 30 |
| Component (c), parts | TMBACl 2 | TBAI 3 | TBABr 2 | TBABr 2 | TBABr 2 |
| Component (d), parts | Contained in (b) | Contained in (b) | Contained in (a) | EPIKOTE825 15 | Not present |
| Curing condition | 140° C. × 20 min | 140° C. × 20 min | 140° C. × 20 min | 140° C. × 20 min | 140° C. × 20 min |
| Gel fraction, % | 93.8 | 94.7 | 96.2 | 92.1 | 0 |

EXAMPLE 17

A blend of 379 parts of the resin solution of Production Example 11 (200 parts as solids), 25 parts of polyethylene glycol (M.W.200) and 2 parts of TBASA was applied on a tinplate, baked at 140° C. for 20 minutes, and tested for the gel fraction. The result is shown in Table 7.

EXAMPLE 18

Example 17 was followed except that 105 parts of PLAC-CEL #308 (trifunctional polycaprolactone polyol, M.W. 850, sold by Daicel Chemical Industries, Ltd.) were replaced for polyethylene glycol. The result is shown in Table 7.

EXAMPLE 19

Example 17 was followed except that 120 parts of KR-2001 (silicone polyol of the formula below sold by ShinEtsu Chemical Co., Ltd.) were replaced for polyethylene glycol. The result is shown in Table 7.

EXAMPLE 21

A blend of 326 parts of the resin solution of Production Example 13 (200 parts as solids), 70 parts of DTMPTA, 20 parts of CELOXIDE 2021 [4-(3,4-epoxycyclohexyl)methoxycarbonyl-1,2-epoxycyclohexane sold by Daicel Chemical Co., Ltd.) and 5 parts of TBACl was applied on a tinplate, baked at 140° C. for 20 minutes and tested for the gel fraction. The result is shown in Table 7.

TABLE 7

|  | Ex. 17 | Ex. 18 | Ex. 19 | Ex. 20 | Ex. 21 |
|---|---|---|---|---|---|
| Component (a), parts | Pro. Ex. 11 379 | Pro. Ex. 11 379 | Pro. Ex. 11 379 | Pro. Ex. 11 379 | Pro. Ex. 13 326 |
| Component (b), parts | PEG 25 | PLACCEL#308 105 | KR-2001 120 | Pro. Ex. 15 + Glycerine 101 + 4 | DTMPTA 70 |
| Component (c), parts | TBASA 2 | TBASA 2 | TBASA 2 | TBASA 2 | TBACl 5 |
| Component (d), parts | Contained in (a) | Contained in (a) | Contained in (a) | Contained in (a) | CELOXIDE2021 20 |
| Curing condition | 140° C. × 20 min | 140° C. × 20 min | 140° C. × 20 min | 140° C. × 20 min | 140° C. × 20 min |
| Gel fraction, % | 92.6 | 93.1 | 90.6 | 91.7 | 91.2 |

EXAMPLE 22

A blend of 340 parts of the resin solution of Production Example 14 (200 parts as solids), 150 parts of PETA, 30 parts of epoxyhexadecane, and 5 parts of TBAC1 was applied on a tinplate, baked at 140° C. for 20 minutes, and tested for the gel fraction. The result is shown in Table 8.

EXAMPLE 23

A blend of 379 parts of the resin solution of Production Example 11 (200 parts as solids), 127 parts of MACRYNAL LH437 (polyfunctional methanetricarboxylic acid ester sold by Hoechst) and 3 parts of tetrabutylammonium phthalate (TBAPA) was applied on a tinplate, baked at 140° C. for 20 minutes, and tested for the gel fraction. The result is shown in Table 8.

EXAMPLE 24

A blend of 405 parts of the resin solution of Production Example 1 (200 parts as solids), 80 parts of PETA, 40 parts of X-22-164B (polysiloxane having 3-methacryloyloxypropyl group at both terminals sold by Shin-Etsu Chemical Co., Ltd.) and 3 parts of TBAPA was applied on a tinplate, baked at 140° C. for 20 minutes, and tested for the gel fraction. The result is shown in Table 8.

TABLE 8

|  | Ex. 22 | Ex. 23 | Ex. 24 |
| --- | --- | --- | --- |
| Component (a), parts | PETA 150 | Pro. Ex. 11 379 | PETA 80 X-22-164B 40 |
| Component (b), parts | Pro. Ex. 14 340 | MACRYNAL LH 437 127 | Pro. Ex. 1 405 |
| Component (c), parts | TBAC1 5 | TBAPA 3 | TBAPA 3 |
| Component (d), parts | Epoxyhexadecane 30 | Contained in (a) | Contained in (b) |
| Curing condition | 140° C. × 20 min | 140° C. × 20 min | 140° C. × 20 min |
| Gel fraction, % | 90.3 | 95.3 | 91.4 |

Production Example 16

Production Example 1 was followed except that the amount of KAYAESTER O was increased to 30 parts and the reaction temperature was raised to 130° C. A resin solution having a nonvolatile content of 50.1% and Mn of 2,500 was obtained.

EXAMPLE 25

Step A

A zinc phosphate-treated steel plate having a thickness of 0.8 mm was coated with a cationic electrodeposition paint (POWER TOP PU-50 sold by Nippon Paint Co., Ltd.) electrically to a dry film thickness of about 25 microns and then with a mid-layer paint (ORGA P-2 SEALER sold by Nippon Paint Co., Ltd.) using an air spray gun to a dry film thickness of about 40 microns. The coated plate was then baked at 140° C. for 30 minutes.

Step B

1. Base Coat Formulation

| ALPASTE 7160 N[1] | 10 parts |
| --- | --- |
| Acrylic varnish[2] | 50 parts |
| CYMEL 202[3] | 10 parts |
| CYMEL 327[4] | 10 parts |
| Isopropyl alcohol | 7 parts |

Foot note:
[1] Aluminum flake pigment paste containing 65% aluminum flake sold by Toyo Aluminum Co., Ltd.
[2] 80% nonvolatile, hydroxyl number 100, acid number 30, Mn 1,800.
[3] Melamine resin sold by Mitsui Cyanamide Co., Ltd., 80% nonvolatile.
[4] Melamine resin sold by Mitsui Cyanamide Co., Ltd., 90% nonvolatile.

2. Top Coat Formulation

| Acrylic resin varnish of Pro. Ex. 16 | 405 parts |
| --- | --- |
| PETA | 80 parts |
| TBANO | 2 parts |
| TINUBIN 900[1] | 6 parts |
| SANOL LS-292[2] | 3 parts |

Foot note:
[1] UV adsorber sold by Ciba-Geigy AG.
[2] Hindered amine antioxidant sold by Sankyo Yuki K.K.

Onto the steel plate substrate prepared in Step A was applied the above base coat composition to a dry film thickness of about 16 microns by air spraying and allowed to set for about 7 minutes. Then, the above top coat composition adjusted to Ford cup #4 viscosity of 30 seconds at 20° C. was applied electrostatically on the base coat wet-on-wet to a dry film thickness of about 40 microns, allowed to set for about 7 minutes, and baked together with the base coat at 140° C. for 25 minutes. The resulting multi-layer film was evaluated for various items. The results are shown in Table 9.

Comparative Example 10

Example 25 was followed except that the top coat composition used was a conventional acrylic-melamine based composition of the following formulation. The results are shown in Table 9.

| Top Coat Formulation for Comparison | |
| --- | --- |
| DIANAL HR-554[1] | 58.3 parts |
| ACR-461[2] | 63.6 parts |
| YUBAN 20N-60[3] | 50.0 parts |
| TINUBIN 900 | 2.0 parts |
| SANOL LS-292 | 1.0 parts |
| n-Butanol | 1.3 parts |
| SOLVESSO 100 | 5.0 parts |

Foot note:
[1] Thermosetting acrylic varnish sold by Mitsubishi Rayon Co., Ltd., 60% nonvolatile.
[2] Thermosetting acrylic varnish sold by Nippon Paint Co., Ltd., 55% nonvolatile.
[3] Melamine resin sold by Mitsui Toatsu Chemicals, Inc., 60% nonvolatile.

TABLE 9

| Item | Ex. 25 | Comp. Ex. 10 |
|---|---|---|
| SVS, %[1] | 55.6 | 49.0 |
| Pencil hardness[2] | H | F |
| Scratch resistance[3] | Good | Fair |
| Acid resistance[4] | Good | Not Good |

Evaluation method
1) Volumetric nonvolatile content (SVS):

The composition was adjusted to a Ford cup #4 viscosity at 30 sec. at 20° C. A 0.5 g aliquot was taken precisely, diluted with 3 ml of toluene, baked at 110° C. for 1 hour to determine the nonvolatile content by weight followed by the conversion into the volumetric nonvolatile content.

2) Pencil hardness:

The method of JIS K5400 8-4-2 was followed.

3) Scratch resistance:

One gram of a 50% aqueous dispersion of a commercial cleanser (NEW HOME CLEANSER sold by Kao Corporation) was applied on a flannel fabric of 2 cm×2 cm size. This fabric was attached to the reciprocating head of a Gakushin type dyeing fastness tester (Daiei Kagaku Seiki K.K.). The test specimen was rubbed with the head under a load of 500 g at 20 reciprocations and percent retention of 20° gloss was determined. The scratch resistance was evaluated according to the following schedule.

Very good: greater than 85%

Good: 70–85%

Fair: 40–70%

Not good: less than 40%

4) Acid resistance:

One drop (0.5 ml) of 0.1N $H_2SO_4$ was pipetted on the specimen and allowed to stand at 75° C. for 30 minutes. Then the change in appearance was observed visually. Judgment was made by the following schedule.

Very good: No trace was observed.

Good: Slight trace was observed.

Fair: Remarkable trace was observed.

Not good: Film was partly eroded.

We claim:

1. A curable resin composition for coating uses comprising:

(a) a component containing a plurality of α, β-ethylenically unsaturated carbonyl groups in the molecule selected from the group consisting of a polyol poly(meth)acrylate, an unsaturated polyester resin, a polyester acrylate resin, an epoxy acrylate resin, a urethane acrylate resin, a polyether acrylate resin, an α,β-unsaturated carbonyl group-containing acrylic resin, and a silicone oligomer having (meth)arcyloyl groups;

(b) a compound or resin containing a plurality of at least one active hydrogen-containing groups selected from the group consisting of an activated methylene group, an activated methyne group and a hydroxyl group in the molecule;

(c) an onium salt exhibiting catalytic activity only in the presence of the epoxy compound under baking conditions and, having an onium cation and counter anion where the onium cation is a tetraalkylammonium, trialkylaralkylammonium, alkylpyridinium, tetraalkylphosphonium or trialkylsulfonium cation and the counter anion is a chloride, bromide, iodide, salicylate, polybasic carboxylate, nitrate, sulfonate, sulfate, sulfite, phosphate or acid phosphate ester anion; and (d) an epoxy compound independently added to the composition or covalently attached to at least one of said component (a) and said component (b).

2. The composition according to claim 1, wherein said component (b) is an ester of an activated methylene- or methynecarboxylic acid with a nonpolymeric or polymeric potyol, a reaction product of a polyamine with diketene, a polymer of an activated methylene group-containing acrylic monomer, or an adduct of an isocyanate compound with an activated methylene compound.

3. The composition according to claim 1, wherein said component (b) is a polyhydric alcohol, an acryl polyol, a polyester polyol, a polyether polyol, an epoxy polyol, a polyurethane polyol or a silicone polyol.

4. The composition according to claim 1, wherein the composition is a one-component, thermosetting composition.

5. The composition according to claim 1, wherein said component (d) is a glycidyl ether, a glycidyl ester, an alicyclic epoxide or an α-olefin epoxide added to the composition as a discrete component.

6. The composition according to claim 1, wherein said component (d) is an epoxy function remaining in said component (a), or glycidyl (meth)acrylate, β-methylglycidyl (meth)acrylate or 3,4-epoxycyclohexylmethyl (meth)acrylate copolymerized with the monomers of an acrylic resin of said component (b).

7. The composition of claim 1, wherein the ratio of α,β-ethylenically unsaturated carbonyl groups in component (a) to active hydrogen-containing groups in component (b) is from 2:1 to 1:2.

8. The composition of claim 1, wherein the amount of component (c) is from 0.1 to 10.0 equivalent % based on the sum of components (a) and (b).

9. The composition of claim 1, wherein the amount of component (d) is from 0.5 to 100 equivalent % based on the sum of components (a) and (b).

10. The composition of claim 1, wherein:

component (a) is pentaerythritol triacrylate;

component (b) is a polymer of an activated methylene group-containing acrylic monomer also polymerized with glycidyl methacrylate to provide a covalently attached epoxy compound as component (d); and component (c) is a tetraalkylammonium salt.

* * * * *